United States Patent
Kovacs et al.

(10) Patent No.: US 7,305,679 B2
(45) Date of Patent: Dec. 4, 2007

(54) PORTAL USING MODEL VIEW CONTROLLER

(75) Inventors: Ernö Kovacs, Stuttgart (DE); Oliver Schramm, Wolfschlugen (DE); Klaus Röhrle, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 382 days.

(21) Appl. No.: 09/898,549

(22) Filed: Jul. 3, 2001

(65) Prior Publication Data

US 2002/0023147 A1    Feb. 21, 2002

(30) Foreign Application Priority Data

Jul. 5, 2000    (EP) .................................. 00114425

(51) Int. Cl.
  *G06F 9/44*    (2006.01)
  *G06F 15/16*    (2006.01)
  *G06F 3/00*    (2006.01)

(52) U.S. Cl. ...................... 719/313; 709/201; 709/217; 715/742

(58) Field of Classification Search ................ 709/310, 709/313, 314, 315, 316, 317, 318, 203, 200–202, 709/223–229; 707/10, 104.1; 719/310, 719/313, 311, 312, 314–318, 322; 345/621; 715/513, 736–744; 717/114
See application file for complete search history.

(56) References Cited

U.S. PATENT DOCUMENTS

| | | | |
|---|---|---|---|
| 6,012,098 A | 1/2000 | Bayeh et al. | |
| 6,199,099 B1 * | 3/2001 | Gershman et al. | 709/203 |
| 6,332,163 B1 * | 12/2001 | Bowman-Amuah | 709/231 |
| 6,571,282 B1 * | 5/2003 | Bowman-Amuah | 709/219 |
| 6,578,068 B1 * | 6/2003 | Bowman-Amuah | 709/203 |
| 6,601,192 B1 * | 7/2003 | Bowman-Amuah | 714/38 |
| 6,601,234 B1 * | 7/2003 | Bowman-Amuah | 717/108 |
| 6,606,660 B1 * | 8/2003 | Bowman-Amuah | 709/227 |
| 6,615,199 B1 * | 9/2003 | Bowman-Amuah | 706/50 |
| 6,615,253 B1 * | 9/2003 | Bowman-Amuah | 709/219 |
| 6,636,242 B2 * | 10/2003 | Bowman-Amuah | 715/764 |
| 6,640,238 B1 * | 10/2003 | Bowman-Amuah | 709/201 |
| 6,640,244 B1 * | 10/2003 | Bowman-Amuah | 709/207 |
| 6,643,652 B2 * | 11/2003 | Helgeson et al. | 707/10 |
| 6,718,515 B1 * | 4/2004 | Conner et al. | 715/509 |

OTHER PUBLICATIONS

European Patent Application, EP 1170673, Application No. 00114425.2, Sep. 1, 2002.*

(Continued)

*Primary Examiner*—Haresh Patel
(74) *Attorney, Agent, or Firm*—Oblon, Spivak, McClelland, Maier & Neustadt, P.C.

(57) ABSTRACT

A portal application implemented on a multipurpose computer provides access from a client to a multimedia service. The portal application comprises a plurality of services respectively structured according to a model-view-controller (MVC) architectural pattern and respectively comprising at least one model containing data, a controller and at least one view for the presentation of data of the model. The services are designed to communicate with each other by way of the controller. Therefore, services can be dynamically installed and removed. Due to the presence of a plurality of uses associated with a single controller, the various services are supported to produce different kinds of mark-up languages for each of a plurality of different devices.

10 Claims, 5 Drawing Sheets

OTHER PUBLICATIONS

Betz K et al: "Developing Highly-Responsive User Interfaces With DHTML and Servlets" Conference Proceedings of the 2000 IEEE International Performance, Computing, and Communications Conference (Cat. No. 00CH37086), Proceedings of 2000 International Conference on Performance, Computing and Communications (IPCCC 2000), Phoenix, AZ, USA, pp. 437-443, XP002168337.

Kristensen A: "Template Resolution in XML/HTML" Computer Networks and ISDN Systems, NL, North Holand Publishing, Amsterdam, vol. 30, No. 1-7, Apr. 1, 1998, pp. 239-249, XP004121423.

Freytag C et al: "Resource Adaptive WWW Access for Mobile Applications" Computers and Graphics, GB, Pergamon Press LTD. Oxford, vol. 23, No. 6, Dec. 1999, pp. 841-848, XP004187832.

* cited by examiner

PORTAL USING MODEL VIEW CONTROLLER

CROSS-REFERENCE TO RELATED APPLICATIONS

This application claims the priority of European Application No. 00 114 425.2 Jul. 5, 2000, under 35 U.S.C. 119.

BACKGROUND OF THE INVENTION

The present invention relates to a portal application for providing access from a client to a multimedia service, to a method for accessing a portal application from a client as well as co a multimedia service comprising a portal application.

The present invention generally lies in the field of mobile multimedia systems, computer networking, distributed processing systems, databases, hand-held computers and wireless communication. The invention particularly relates to the management of services which can represent the information in different kinds of mark-up languages.

Providing mobile internet to cellular phones is possible through the introduction of special adapted web pages. Theses web pages must be provided through a particular mark-up language (C-HTML in Japan, WAP in Europe, HDML in the USA). The offered services might be the same but differ in presentation and interaction with the user. Providing services to normal web customers but also for mobile users requires the coding of the service for all these different users. If in the future additional further mark-up languages might arise (e.g. in the broadcasting industry) the effort for providing services to users via these further mark-up languages will still increase.

From the prior art so-called service portals are well known. Service portals provide a suit of services of the internet. The basic idea of the service portals is to give the user access to a set of services, so that he will stay longer with the selected portal provider and so that he will return more often.

Mobile service portals are an extension of the service portal idea to wireless internet services. These services are usually provided through special wireless access protocols, but also use mark-up languages that are specially targeted for the mobile device (e.g. Compact HTML in Japan, WAP in the GSM world or HDML in America).

Normally the functions for handling the portal functions (e.g. user identification, service profile, etc.) and the mobile services are directly mixed. For example scripts, graphics and other objects might be stored together.

Building a mobile service portal requires the provision of an infrastructure of common scripts used by the different services. The set of available services must be managed on a per-user base. Especially free services and subscribed services must be separated and managed individually. Different devices (especially mobile devices) require different mark-up languages for presenting the service to a user. Besides that the used service logic and the components executing the logic should remain the same. Some device types might not support a full range of mark-up tags. In this case the service designer would like to prepare adapted pages optimised just for the targeted device type.

SUMMARY OF THE INVENTION

In view of the above-captioned prior art it is the object of the present invention to present a technique for constructing a portal application and a multimedia service in a flexible and modular way such that the portal application can be scaled up easily by adding further services and such that different mark-up languages can be easily presented.

According to the invention the presentation (the use of the proper mark-up language) is separated from the logic of the service such that common parts of a service can be reused This furthermore reduces the time to provide services to different devices.

According to the invention services can be dynamically installed and removed and the services are supported to produce different kind of mark-up languages for different devices.

According to the present invention therefore a portal application for providing access from a client to a multimedia service is presented. The portal application comprises a plurality of services respectively structured according to the so-called model-view-controller architecture and respectively comprising at least one model containing data, a controller and at least one view for the presentation of a proper mark-up language. The services are designed to communicate with each other by means of the respective controller.

A controller can be designed to control at least one further controller of another or the same service.

A controller of a service can be designed to control a plurality of uses for different presentations.

A controller of a service can be designed to select one of a plurality of uses of the service according to the mark-up language used.

The controller can be designed to furthermore select one of plurality of uses for the presentation depending on one of:
the browser characteristic of the client,
device characteristics,
time and/or date,
location,
language,
user preferences and others.

According to a further aspect of the present invention a portal application for providing access from a client to a multimedia service is provided wherein the portal application comprises at least one service structured according to the model-view-controller architecture (MVC architecture) and comprising at least one model containing data, at least one controller and a plurality of use for the presentation of different mark-up languages.

The state of the controller can be a function of the request of the client's request. The client's request can contain information on the mark-up language used.

According to a still further aspect of the present invention a multimedia service is proposed comprising a portal application as set forth above.

According to a still further aspect of the present invention a method for accessing a portal application from a client is proposed. The portal application comprises services structured according to the model-view-controller architecture. The method comprises the step of sending a request to a core service responsible for user management and/or administrative processing, forwarding the request from the core service to a special service, and establishing a communication between the client and the special service.

The special services can be distributed over a network.

In the following further advantages, features and objects of the present invention will become evident for the man skilled in the art by means of a detailed explanation of embodiments of the present invention taken in conjunction with the figures of the enclosed drawings.

DETAILED DESCRIPTION OF THE PREFERRED EMBODIMENTS

Figure 1:
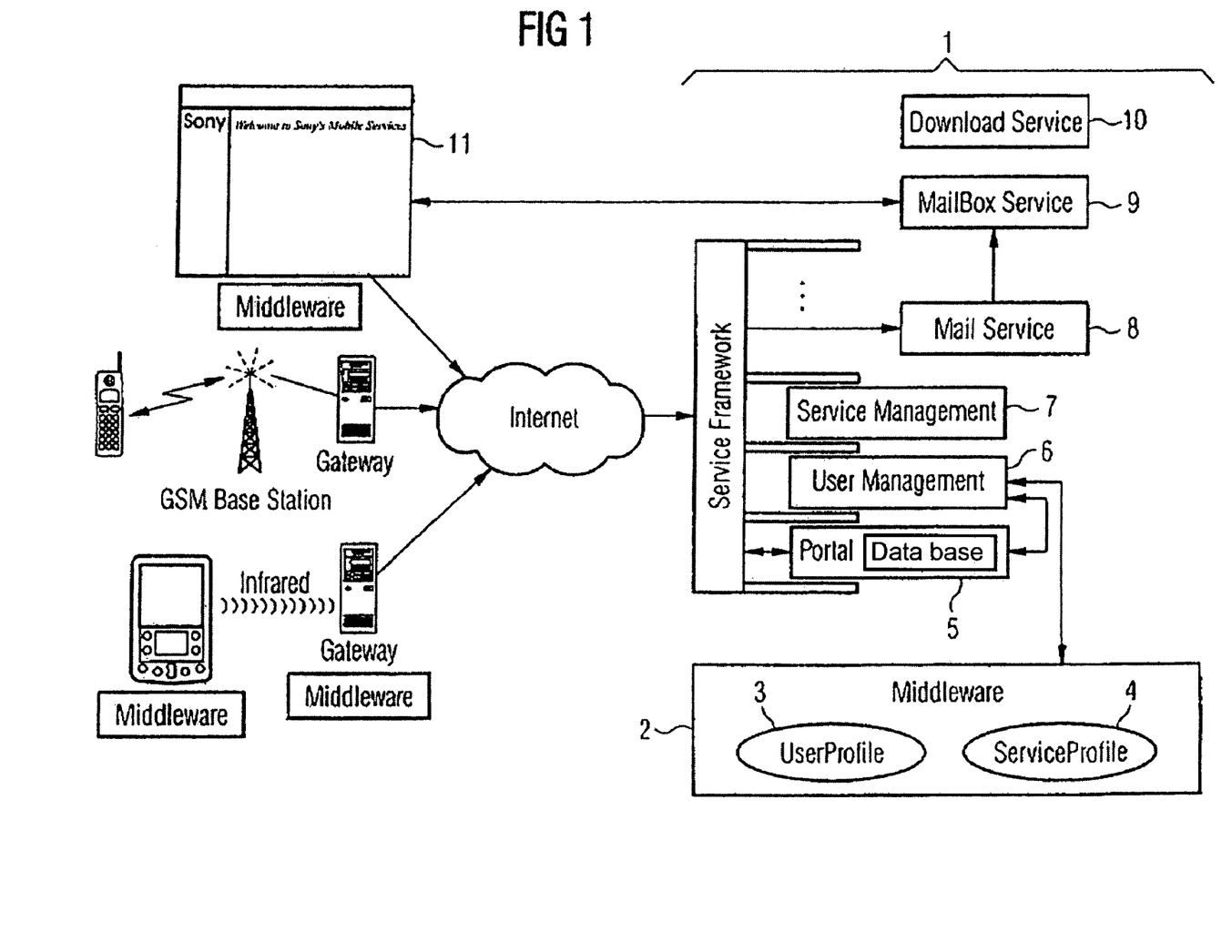
FIG. 1 shows the framework of the present invention.

With reference to FIG. 1 the framework of the present invention will be explained.

By means of a network such as for example the internet clients 11 with browser can access a multimedia service 1. The multimedia service 1 is built on top of a middleware 2 which can comprise a user profile database 3 and a service profile database 4.

The multimedia service 1 is built up of a plurality of services, which can be generally divided into management and administration related core services, such as a portal 5, a user management service 6 and a service management 7 and special services such as a mail service 8, a mailbox service 9 and a download service 10.

Figure 2:
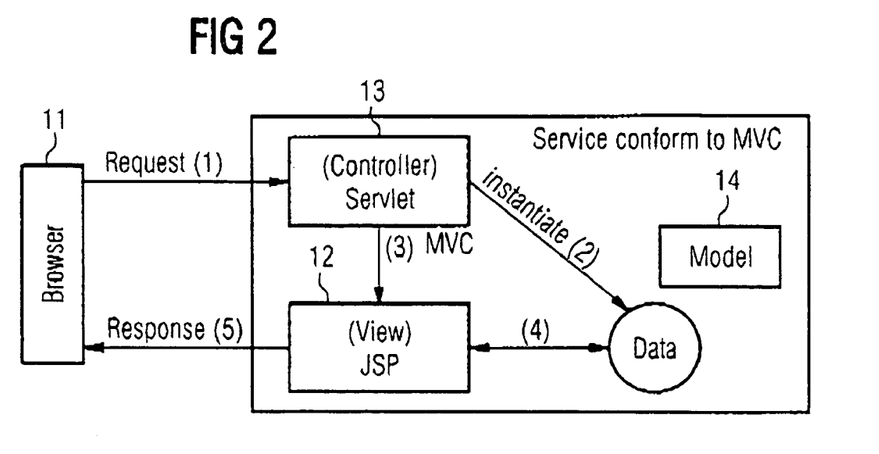
FIG. 2 shows the internal structure of a service conforming to the MVC (model-view-controller) architecture.

FIG. 2 shows the internal structure of a service. Generally the services are all constructed according to the MVC (model-view-controller) architecture and comprise a controller 13 being a servlet corresponding to a small program running on a server, a view 12 for the presentation via mark-up languages and a model 14 containing data.

The model-view-controller architectural pattern is for example explained in Buschman et al: Pattern-Oriented Software Architecture: A System of Patterns, John Wiley & Sons, 1996. The model-view-controller architectural pattern divides an interactive application into three components. The model contains the core functionality data. Views display information to the user. Controllers handle user input. Views and controllers together can comprise the user interface.

The model component therefore encapsulates core data and functionality. The model is independent of specific output representations or input behaviour. Views components display information to the user. A view obtains the data from the model.

The controller component receives input, usually as events that encode mouse movement, activation of mouse buttons or keyboard input. Events are translated to service requests for the model or the view. The user interacts with the systems solely through controllers. An object-oriented implementation of MVC defines a separate class for each component.

Based on these technologies, a service can be build out of servlets, middleware components, a choice of presentation languages and other resources like image and/or video-clips e.g. The co-ordinated workflow is given through the utilisation of the model-view-controller pattern.

FIG. 1 shows the basic principle. A service conforms to the model-view-controller design pattern. The mobile user accesses a service by means of a browser (this might be a microbrowser in the mobile world). The request is issued to the controller servlet. This servlet controls the execution of the request. It might use information from the model object and uses the view objects to present output to the user. The view object can be f.e. a Java Server Page (JSP). JSP pages allow easily mixing presentation (e.g. HTML elements) with service logic in the form of Java bean objects. The Java bean object accesses the model object for retrieving data or for executing the service logic.

Using this approach has several advantages:

Separation of Concern

The different aspects of a service are clearly separated. The controller object receives the object, analyses the request, analyses the status of the interaction and checks for information about the browser, the type of requested mark-up. Based on this information it selects an available view object.

This view object does not have to care for these details, but prepares the information page that is displayed to the user. Through the JSP concept, mark-up language and service logic is clearly separated.

Finally, the service logic and data handling parts of the service is executed by model components which can be written f.e. in Java and might access databases or perform the requested functions, Uniform Service Structure The selected schema enforces a uniform service structure.

Different Views for Different Situations

Having different views that are dynamically selected through the controller makes it easier to provide different output for different devices and mark-up languages.

Communication between different services is realised by JAVA servlets' communication facilities. Java server pages are dynamically compiled to Java servlets. Browser requests are forwarded between the servlets.

Usage of Mobile Middleware

One part of the invention is to apply these kinds of techniques to manage the life cycle of services. To get an clear understanding, FIG. 2 shows the basic relation between the MVC pattern and JAVA servlets.

Figure 3:
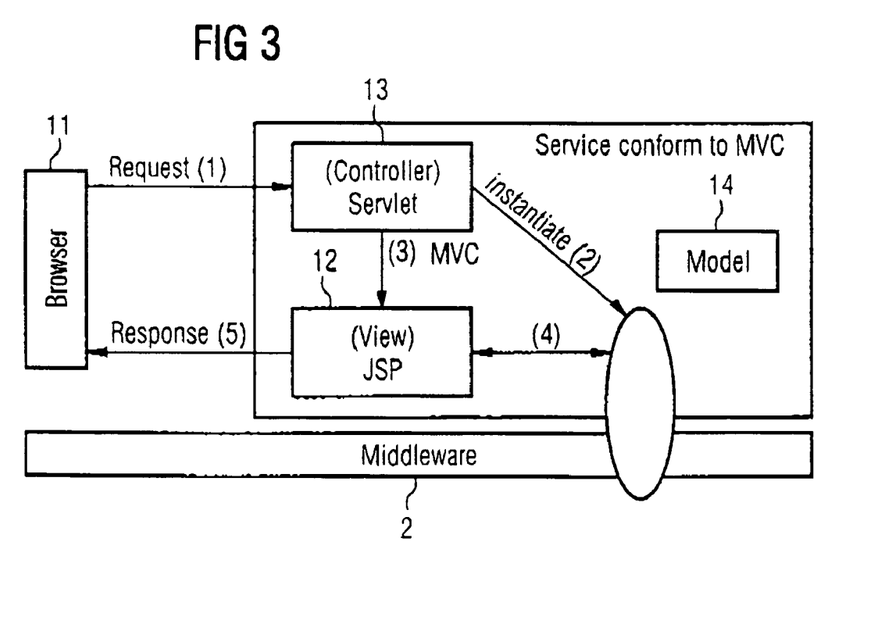
FIG. 3 shows the relation between an application according to the present invention on top of a middleware.

In terms of the normal MVC design pattern, the model is a data container, which can be accessed to gain information to represent this in a view. The framework extends the functionality of a model by a middleware concept. As outlined in FIG. 3 the model might be a normal data container, or it can offer middleware functionality to services.

Framework Services and Special Services

Using the above described concepts, a set of services can be offered. We distinguish between framework services and special services.

Framework Services

This set of service is offered from the portal framework. These are services managing the portal. For example, administration services like user management or online subscriptions are part of the portal and always present.

This does not mean that all users can access these services. The usage of administrative services for example are only allowed for administrative users. Here is a list of advantageous framework services:

Portal Service

Serves as an administrative service which is managing all the administrative stuff like controlling the access to specific services and building up sessions between browsers and services.

User Management Service

Handles the lifecycle of mobile service users—add, modify properties, assign user to specific mobile services, manage access lists, delete a user.

Service Management Service

Handles the lifecycle of mobile services—add, start, modify properties, stop, delete services.

Special Services

Special services are the services offered through the portal. When a user reaches the entry page of the portal, he/she is presented with the set of free services. After login, the set of available services consists of the free services and the set of subscribed services.

Special services can be added and deleted on the fly. Examples for special services are:

Instant Message Broker Service

A message allowing to enter instant messages and to send them to mobile users. Instant messages might be converted to short messages and sent to the GSM phone of the target user.

Instant Message Box

The instant message box contains copies of messages that are sent to the-user. The user might configure his system so that every message or only a subset of messages are stored in the instant message box.

Electronic Content Sales Service

A service selling electronic content (e.g. games, music, video, . . . ).

Further Advantages

One advantage of the selected technologies is that since all components are written in JAVA they can migrate between different virtual machines. This allows for dynamic load balancing.

The main issue targeted by our service framework, and the most important part of our invention, is that the service framework is very scaleable and it is very easy to handle distributed mobile services in this service framework. Especially it is quite easy to add or remove services from the service framework.

The scalability and flexibility is gained though merging of the controlling concept of the MVC pattern and the servlet's communication mechanism. A user-agent's request can be conditionally forwarded or redirected to specific services which itself can forward the request to other, maybe more specific, services.

Figure 4:
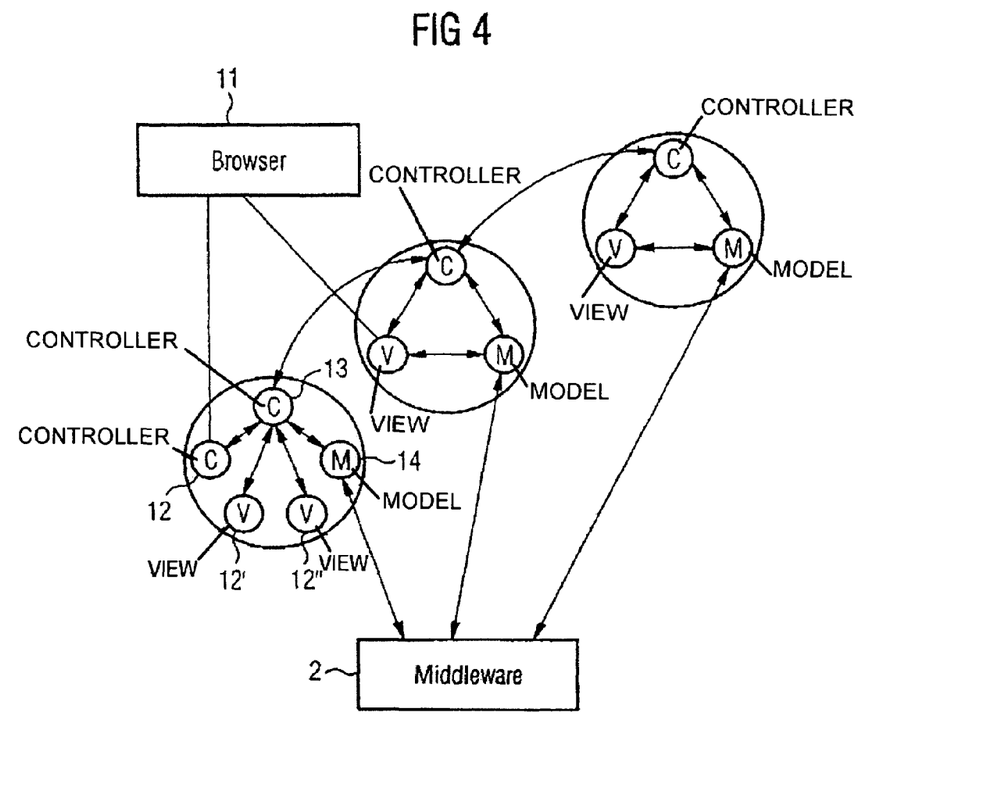
FIG. 4 shows the structure of services according to the present invention communicating via the controller of the service, wherein a plurality of views can be associated with one controller.

FIG. 4 shows that a multimedia service and particularly a portal application according to the present invention is constructed in a modular way. Further services can be added easily, as the controller units 13 of a service are respectively designed for a direct communication with each other.

One controller 13 of a service can be associated with a plurality views 12, 12', 12" for representing the same data of the model component 14 with different mark-up languages. In other words, each of the views 12, 12', 12" is responsible for the representation of a data of the model component 14 with a particular mark-up language.

Figure 5:
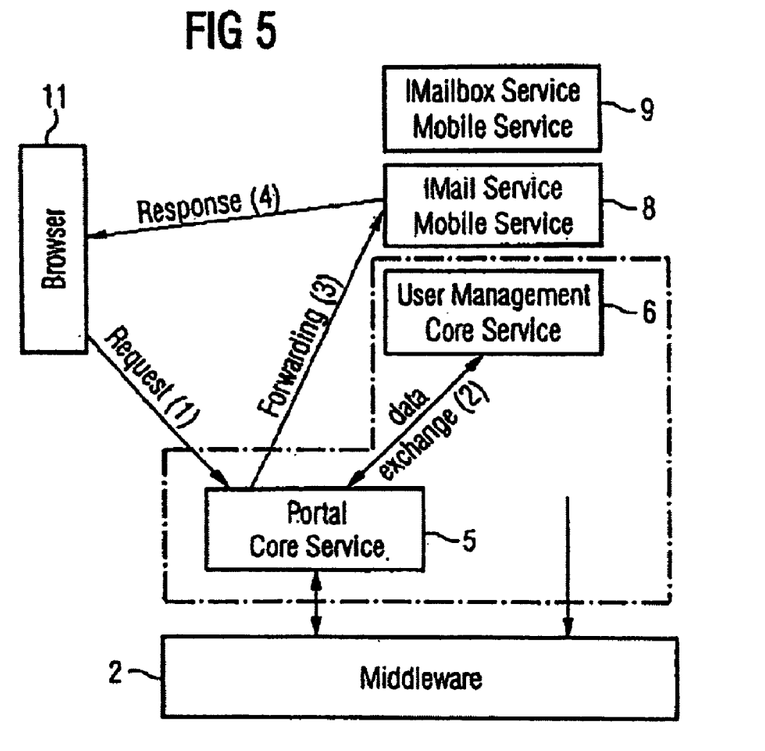
FIG. 5 shows schematically the procedure to build up an interaction between the browser of a client and a special (mobile) service.

As can be seen from FIG. 5, the interaction between a client with a browser 11 and a mobile service 8, 9 can be divided into two steps: At first the client 11 sends a request to one of the core services 5, 6 which are responsible for administrative and management purposes. The request is for example processed by a portal core service 5 which exchanges data with a user management core service 6 for example to check the identity of the client with a browser 11 and to validate passwords etc. The request is furthermore forwarded to a special service such as a mail service mobile service 8 in case the interaction of the portal core service 5 with the user management core service 6 in step 2 had a positive result. Once the request of the browser 11 of the client has been passed and processed through the portal core service 5 the further interaction then takes place directly between the client 11 and the browser and the dedicated special mobile service 8, 9.

FIG. 5 outlines the basic idea of forwarding based on the MVC's controller.

To summarise the interaction:

(1) The portal service's controller receives a request from an user-agent (browser).
(2) The portal service's controller validates the request with the help of the user management service.
(3) The portal service's controller forwards the request to the IMail service's controller.
(4) The IMail service's controller sends a response to the user-agent.

Based on the JAVA servlet's technology the services need not reside on the same JAVA servlet engine.

Generating of Different Presentation Languages

Each graphical user interface interaction can be split up into separate steps. These steps can be described by a finite state machine.

As mentioned above all services are conform to the MVC pattern. By designing the controller as a finite state machine the steps of interaction can be steered by such a controller.

A controller is, conform to the MVC pattern, also responsible to select the appropriate presentation (view). Based on the requested format it can decide which kind of presentation language is convenient for the user's agent requests.

Figure 6:
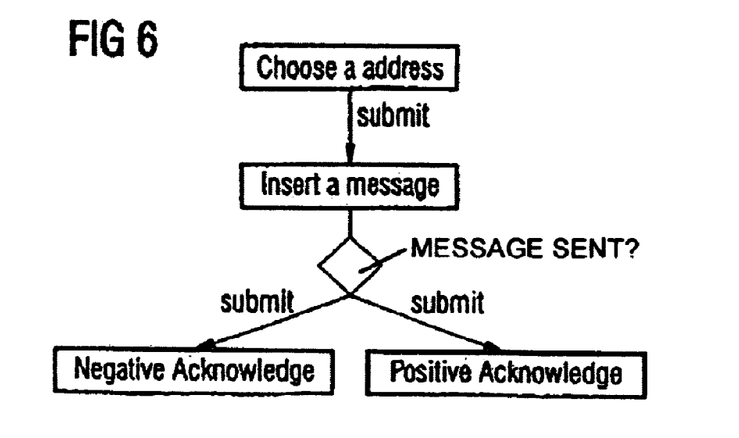
FIG. 6 shows a dialog sequence according to the present invention.

FIG. 6 demonstrates how this interaction can work. The context of this scenario is to send a message and therefore the sender has to select a specific address, insert a specific message—and at the end the user receives a positive or negative acknowledgement dependent whether the message has been sent successfully or not.

All rectangles represent information in a specific mark-up language like XHTML or WML. Dependent on the user-agents request a service's controller can determine which presentation mark-up can be presented by the user's user-agent. Based on this information the controller can determine in which presentation language the content must be sent.

An advanced feature of this invention is that the finite state machine can be extended to use sub-finite state machines. This is important when the representation of the business content depends on the used representation language. E.g. there are different dialogs for user interfaces written in XHTML and WML.

Figure 7:
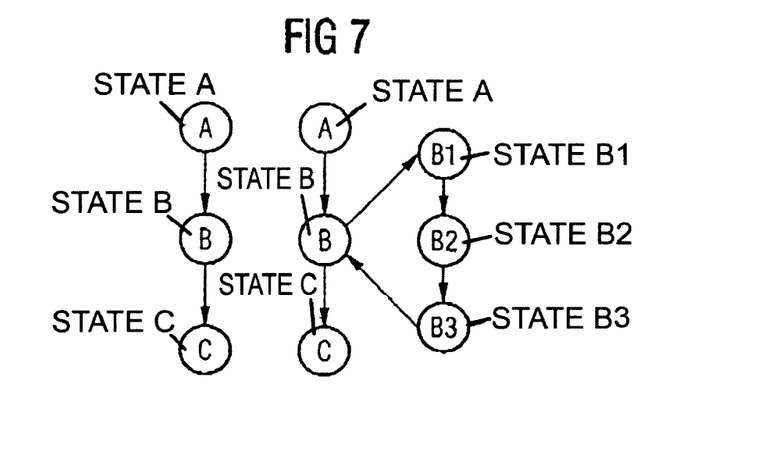
FIG. 7 shows states of a controller dependent on the presentation language.

FIG. 7 shows different finite state machines. In the case a user-agent can only represent WML the controller uses a subset B1, B2, B3 of the available states as in the case of using HTML. This may vary dependent on the presentation language.

Figure 8:
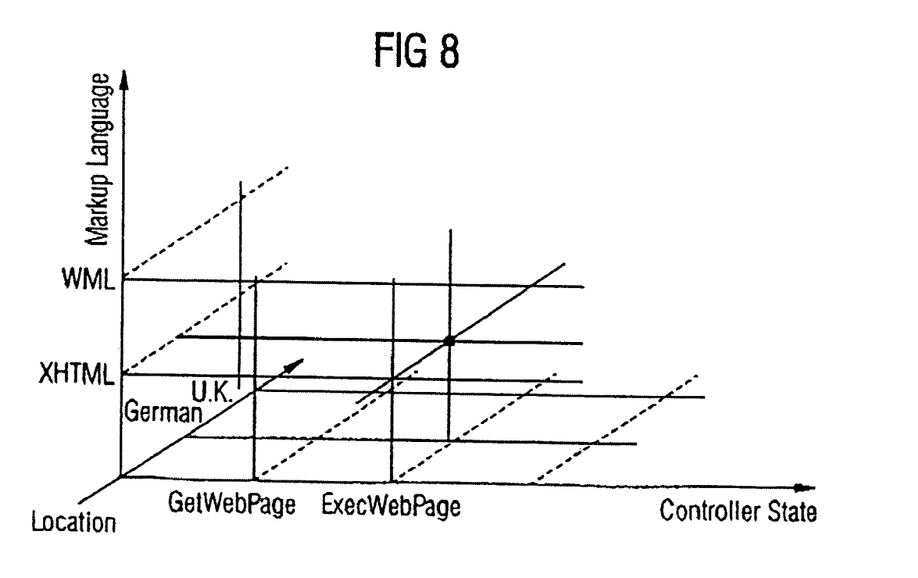
FIG. 8 shows a graphical representation of a controller state depending on a plurality of criteria such as location and used mark-up language.

FIG. 8 summarises the relation between the amount of presentation languages and dialog steps, realised by a finite state machine in the service's controller.

Criteria for the Selection of a Presentation Format

Besides the selection of an appropriate mark-up language for the client device, the controller may also take other criteria into account. A service may for example specify different presentations for different times of the day or in different languages. Or if there is information about a specific user (users must login to the system) the service may want to adapt to user preferences e.g. it may use bigger fonts for visually impaired users.

These presentations may not differ in their service relevant content but vary according to other criteria. Such criteria could be
browser characteristics
device characteristics (e.g. screen size)
time/date
language
user preferences Of course it is hard for a service developer to develop presentations for all different combinations of possible criteria. Therefore the service may want to add filters which can convert a given presentation into a different format (this is not possible with all formats e.g. automatically translation of pages is still not possible in good quality). Such filters can be easily added to the service framework (they may also be part of the middleware). The process of selection a suitable presentation format then involves to select an appropriate base format according to a subset of the relevant criteria (these base formats still have to be developed) and then an adaptation using filter mechanisms to meet the missing criteria.

The invention claimed is:

1. A portal application, embodied in a computer storage medium, comprising instructions which when executed by a processor causes the processor based device to provide access through a network from a client to a multimedia service provider via a portal, the portal application comprising instructions for:
   a portal core service to perform administrative services;
   a user management core service to perform client related services; and
   a plurality of special services distributed over the network, each of said special services structured according to a model-view-controller architecture, each of said special services comprising:
   at least one model containing data;
   a controller for the special service;
   at least one view for a presentation of the data of a model to the client;
   each of the plurality of special services communicates with each of a remaining plurality of special services using a direct communication, via the controller of the special service,
   the portal core service and the user management core service are located at the portal and the plurality of special services are located at the multimedia service provider,
   the portal core service and the user management core service are configured to forward a request from the client to a first special service of the special services,
   the first special service is configured to forward the request from the client to a second special service of the plurality of special services when the second special service has more specific information than the first special service, and
   a direct communication link is established between the client and the second special service to provide service to the client.

2. The portal application according to claim 1,
wherein the controller of a service is designed to control at least a second controller,
wherein said second controller is contained in said service or in a different service.

3. The portal application according to claim 1,
wherein the controller of a service is designed to control a plurality of views,
each of said plurality of views allows a different presentation.

4. The portal application according to claim 3,
wherein the controller of a service is designed to select one of the plurality of views of the service in accordance with a mark-up language used.

5. The portal application according to claim 4,
wherein the controller is designed to select one of the plurality of views for the presentation in accordance with at least one of a browser characteristic of the client, device characteristics, a time and/or date, a location, a language, and one or more user preferences.

6. A method to provide access through a network from a client to a multimedia service provider via a portal, comprising:
   performing, by a portal core service, administrative services;
   performing, by a user management core service, client related services;
   providing a plurality of special services distributed over the network, each structured according to a model-view-controller architecture, each of said special services comprising:
   at least one model containing data,
   a controller for the special service, and
   at least one view for a presentation of the data of a model to the client;
   each of the plurality of special services communicating with each of a remaining plurality of special services using a direct communication, via the controller of the special service;
   locating the portal core service and the user management core service at the portal and the plurality of special services at the multimedia service provider;
   forwarding, by the portal core service and the user management core service, a request from the client to a first special service of the special services;
   forwarding, by the first special service, the request from the client to a second special service of the plurality of special services when the second special service has more specific information than the first special service; and
   establishing a direct communication link between the client and the second special service to provide service to the client.

7. The method according to claim 6, wherein the controller of a service is designed to control at least a second controller, and
wherein said second controller is contained in said service or in a different service.

8. The method according to claim 6, wherein the controller of a service is designed to control a plurality of views, each of said plurality of views allows a different presentation.

9. The method according to claim 8, wherein the controller of a service is designed to select one of the plurality of views of the service in accordance with a mark-up language used.

10. The method according to claim 9, wherein the controller is designed to select one of the plurality of views for the presentation in accordance with at least one of a browser characteristic of the client, device characteristics, a time and/or date, a location, a language, and one or more user preferences.

* * * * *